United States Patent [19]
Aiston et al.

[11] Patent Number: 6,050,516
[45] Date of Patent: *Apr. 18, 2000

[54] RETRACTOR

[75] Inventors: Brian Edward Aiston, Carlisle; Alan George Smithson, Wetheral; Joseph Patrick Harte, Maryport; Kenneth Williamson, Carlisle, all of United Kingdom

[73] Assignee: Breed Automotive Technology, Inc., Lakeland, Fla.

[ * ] Notice: This patent is subject to a terminal disclaimer.

[21] Appl. No.: 08/930,092

[22] PCT Filed: May 10, 1996

[86] PCT No.: PCT/GB96/01142

§ 371 Date: Feb. 9, 1998

§ 102(e) Date: Feb. 9, 1998

[87] PCT Pub. No.: WO96/35596

PCT Pub. Date: Nov. 14, 1996

[30] Foreign Application Priority Data

May 10, 1995 [GB] United Kingdom .................. 9509429

[51] Int. Cl.[7] ................................................. B60R 22/42
[52] U.S. Cl. .......................... 242/381.1; 242/382.6
[58] Field of Search ............................ 242/381.1, 381.4, 242/382.6; 280/806; 297/478, 480

[56] References Cited

U.S. PATENT DOCUMENTS

| | | | |
|---|---|---|---|
| 4,394,034 | 7/1983 | Murphy et al. | 280/806 |
| 5,029,770 | 7/1991 | Tanaka et al. | |
| 5,174,604 | 12/1992 | Numazawa et al. | 280/806 |
| 5,647,553 | 7/1997 | Smithson et al. | 242/381.1 |

FOREIGN PATENT DOCUMENTS

| | | |
|---|---|---|
| 319289 | 6/1989 | European Pat. Off. . |
| 443764 | 8/1991 | European Pat. Off. . |
| 487760 | 6/1992 | European Pat. Off. . |
| 3417877 | 6/1989 | Germany . |
| 2113978 | 8/1983 | United Kingdom . |
| 2126876 | 4/1984 | United Kingdom . |

OTHER PUBLICATIONS

Research Disclosure, No. 336404, Aug. 1994, Emsworth, G.B., p. 404, "Energy Absorbing Webgrabber–Concept C".

Primary Examiner—John M. Jillions
Attorney, Agent, or Firm—Markell Seitzman

[57] ABSTRACT

A web-locking retractor comprising a spool (16) about which seat belt webbing is wound, the spool (16) being rotatably mounted on a spindle which is slidably mounted in a frame (12), at least one sensing mechanism (200) responsive to conditions indicative of a crash to cause the spool (16) to lock to prevent further protraction of the seat belt webbing, a web-clamping mechanism (46) operable in response to vertical movement of the spool (16), sensing mechanism (200) and retraction spring (180) relative to the frame (12), to clamp the seat belt webbing against further protraction of the belt, wherein vertical movement of the spool (16), sensing mechanism (200) and retraction spring (180) take place subsequent to locking of the spool (16). Preferably the spool (16) is supported for rotational movement on a spindle, the ends of which are received in a slot in the frame (12). This spindle may for example be one arm of a U-shaped needle (150), the other arm (154) of which is received in another slot in the frame (12).

23 Claims, 6 Drawing Sheets

RETRACTOR

DESCRIPTION

The present invention relates to a retractor for use with vehicle safety restraint belts and particularly to a weblocking retractor in which one or more clamps grip the belt webbing to prevent payout of the belt in the event of a crash or emergency situation.

Retractors and weblocking retractors are well known. Generally they comprise a cyclindrical spool rotatably mounted in a frame with a return bias so that the belt can be protracted but is biased to the rewind position. One or more sensing mechanism are included and cause the spool to lock-up during an emergency, such as when excessive acceleration or deceleration forces are detected. In a weblocking retractor, belt payout is further restrained by one or more wedges which grip the belt directly. One example is shown in U.S. Pat. No. 5,029,770.

It is an object of the present invention to provide an improved weblocking retractor.

According to one aspect of the present invention there is provided a weblocking retractor comprising:
  a spool about which seat belt webbing is wound;
  the spool being mounted so as to rotatable about an axis which is slidably mounted in a frame;
  at least one sensing mechanism responsive to conditions indicative of a crash to cause the spool to lock to prevent further protraction of the seat belt webbing;
  a web-clamping mechanism operable in response to a sliding movement of the spool relative to the frame, to clamp the seat belt webbing against further protraction of the belt;
  characterised in that sliding movement of the spool takes place subsequent to locking of the spool and directly activates the clamping mechanism to clamp the webbing, and
  wherein the spool is supported for rotational movement on a spindle comprising one arm of a U-shaped needle which is mounted in slots in the frame to move with the spool in a sliding linear movement.

The other arm of the U-shaped needle is received in another slot in the frame.

According to a preferred embodiment the spool and the sensing mechanism are moved vertically in response to occupant loading of the belt after spool locking. A carrier element supported in fixed relation to the spool and also a rewind spring for the spool are also preferably moved vertically.

For a better understanding of the present invention and to show how the same may be carried into effect, reference will now be made to the accompanying drawing in which.

Figure 1:
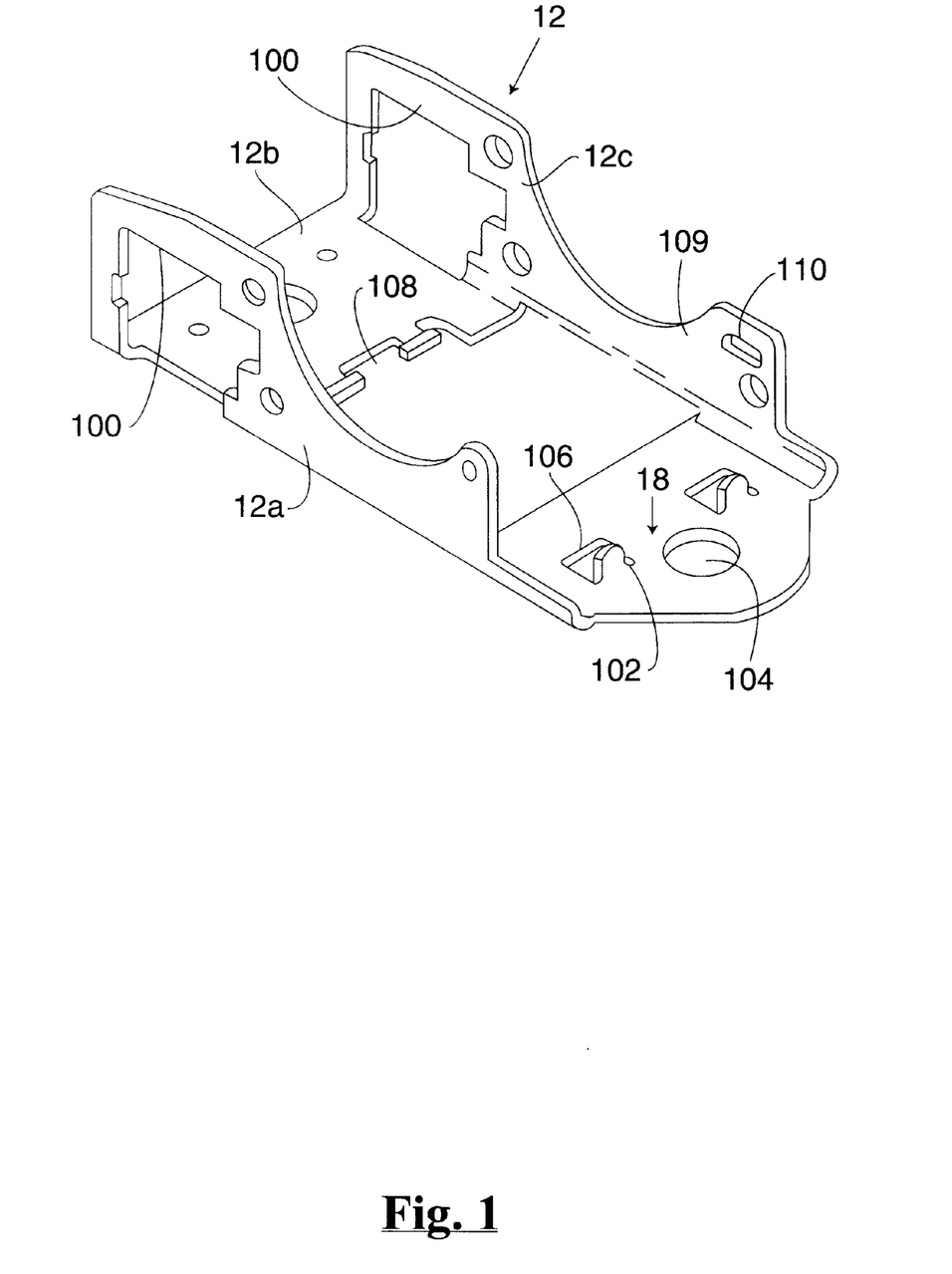
FIG. 1 is an isometric view of a frame.

FIG. 1 is an isometric view of the stationary frame 12 and comprises sides 12a and 12b and a back 12c. The upper portion of the frame includes a plurality of openings 100 to receive a web clamping mechanism 46. This web clamping mechanism 46 comprises a wedge housing 47 and two movable wedges 46a,b. The wedge housing 47 is held within the opening 100 by a spacer bar 47a which includes a web (seat belt) guide slot 47b. The lower portion 102 of the frame 12 includes a mounting hole 104 and anti-rotation projections 106 which are known in the art. The center or back portion 12c of the frame 12 includes a plurality of bosses 108 which slidingly engage and secure complementary member 107 in the back part 22c of a mounting member 22 of a reel assembly 14 (see FIGS. 2 and 3) to enable the reel assembly to slide on the frame 12. The lower end 109 of the side 12b of the frame includes an elongated slot 110 through which a peg 180 of the reel assembly is received, thereby providing another means for slidably securing the mounting member 22 to the stationary frame 12.

Extending from each of the sides is a stationary panel or bushing which can be viewed as an extension of the frame sides 12a,h. Situated on the left hand frame side 12a is a mechanism bushing 164. This bushing 164 is attached to frame side 12a. The mechanism bushing includes an oval slot 160b which overlays slot 160" in frame side 12a. The bushing mechanism also includes an opening 174a in its middle through which a stub axle 170a of the spool 16 extends. Located at the lower end of the bushing 164 is an open cavity 211 to slidingly received the walled housing 210 of the sensor mechanism.

Figure 4:
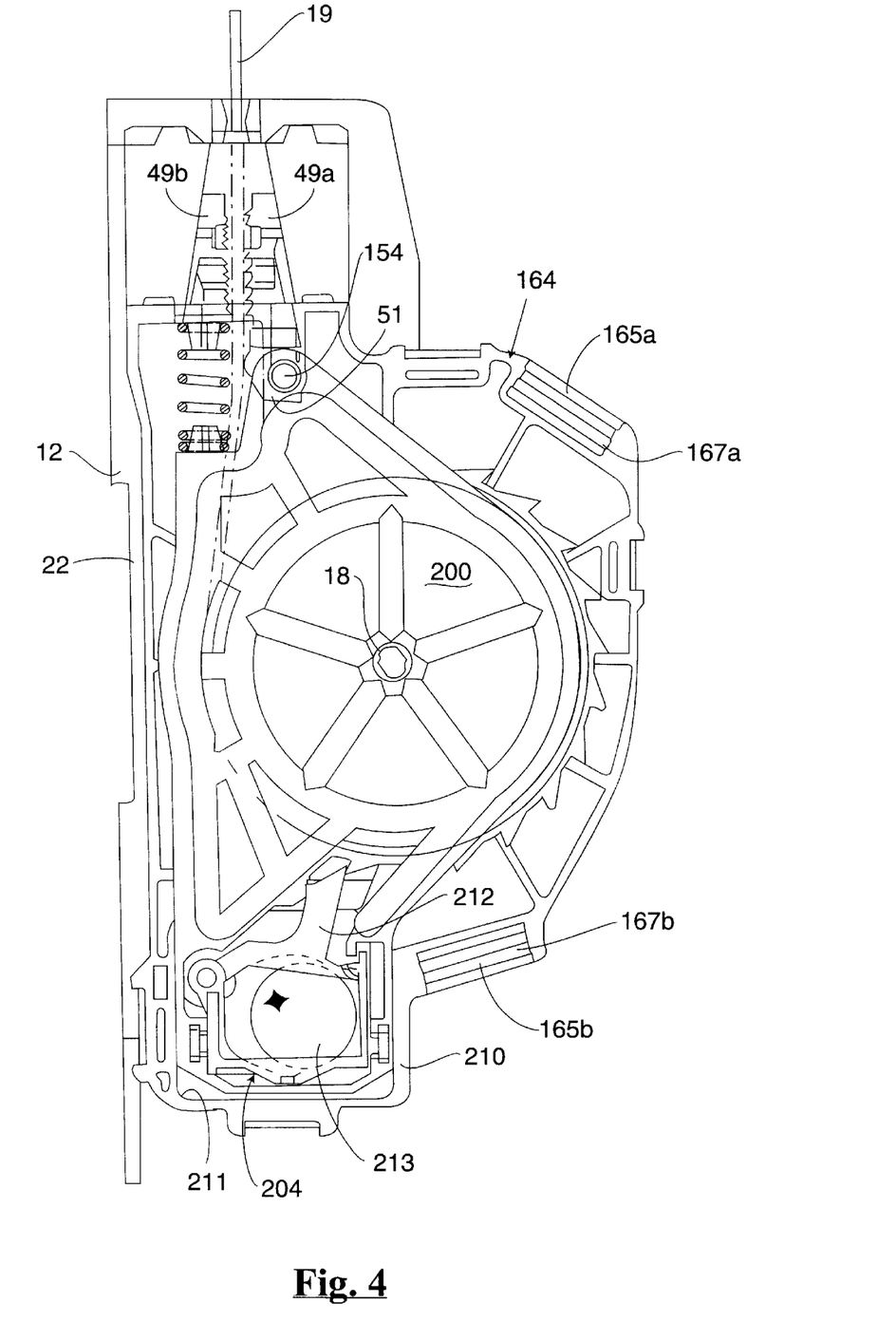
FIG. 4 is a sensor mechanism in a preblocking condition.
Figure 5:
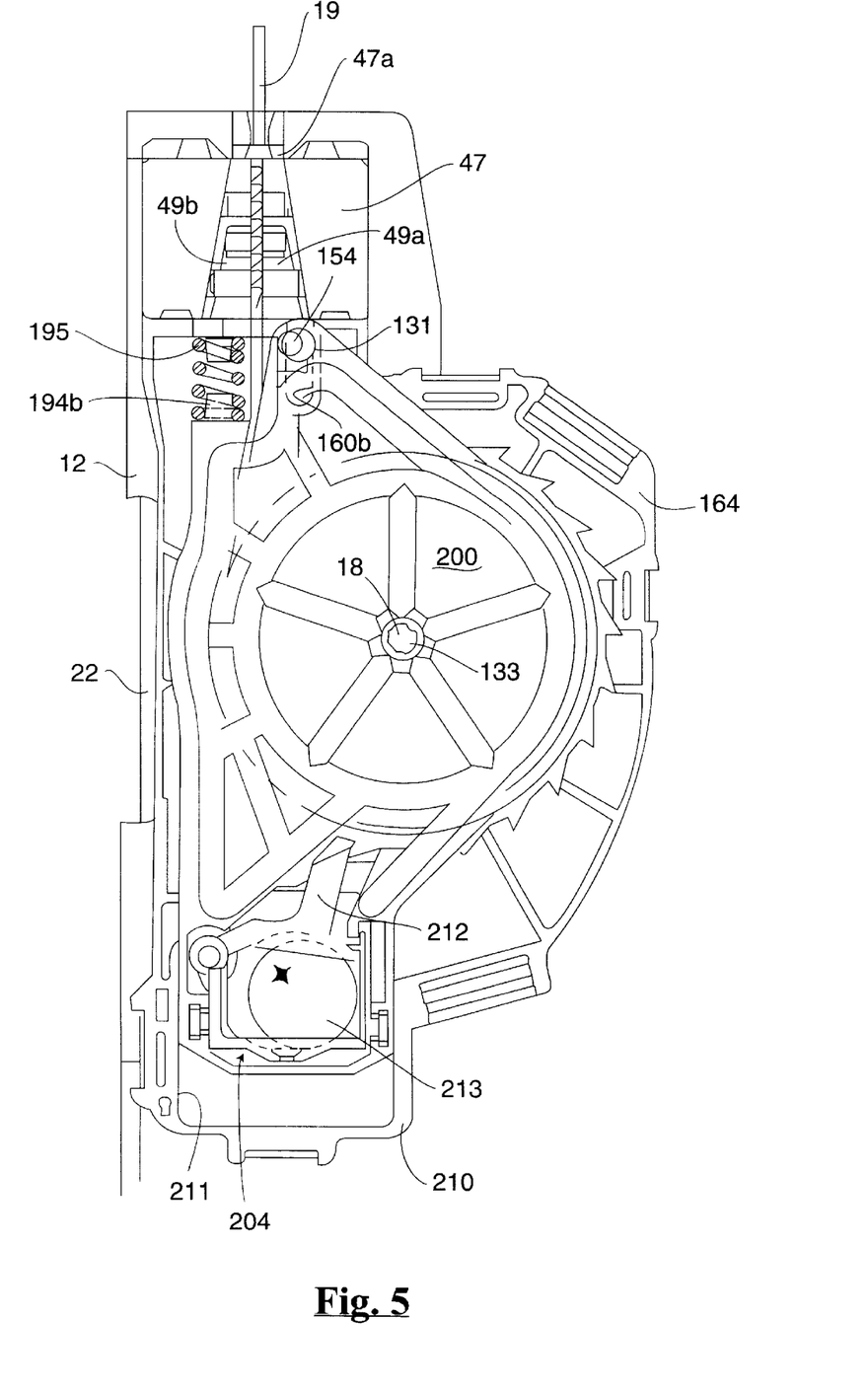
FIG. 5 shows the reel assembly in a vertically raised position.

Situated on the right hand frame side 12b is a spring bushing 162 which is also referred to as an inner spring cover. This cover includes an oval slot 160a adjacent the oval slot 160' of the frame side 12a. The spring inner cover or bushing 162 includes a vertical oval slot 174a through which a stub axle 170 extends. This stub axle includes a slot 171 to receive an inner end of a rewind spring 178 and functions as a spring arbor. The bushings 162 and 164 are tied together by cross members 165a,b that fit in grooves 167a,b as shown in FIGS. 4 and 5.

Figure 2:
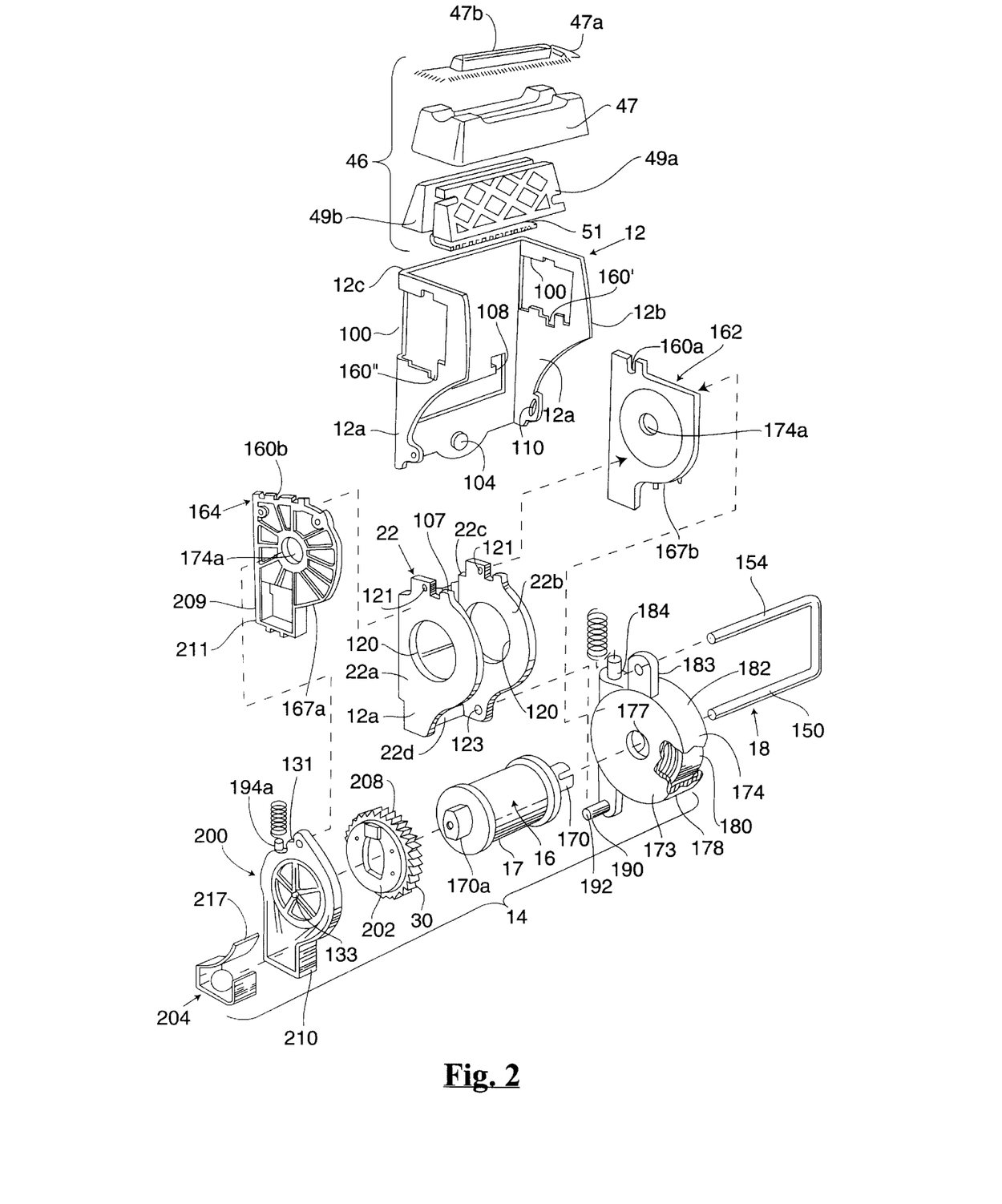
FIG. 2 is an assembly view showing many of the major features of the present invention.
Figure 3:
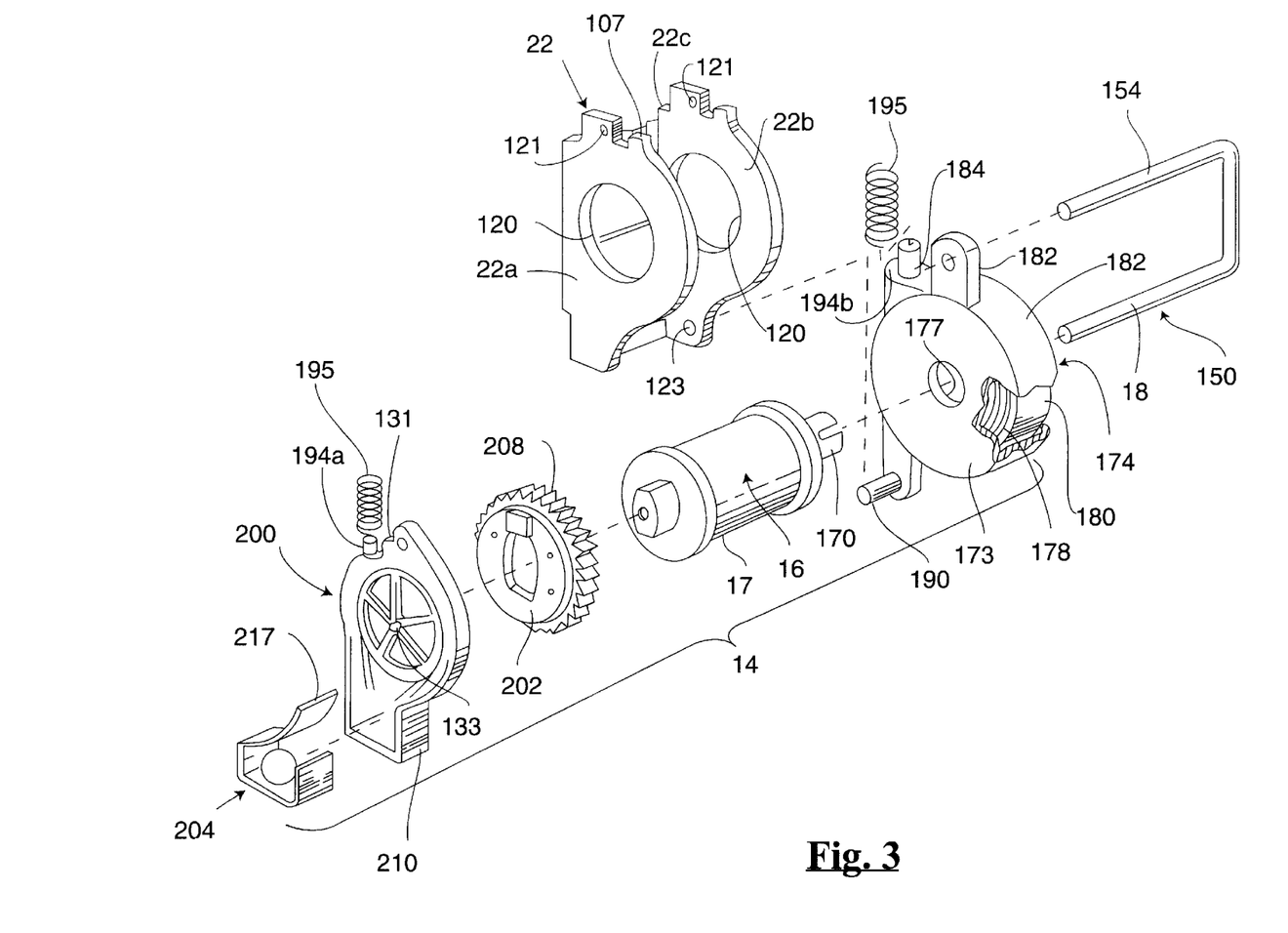
FIG. 3 is an enlarged isometric view of a reel assembly.

The reel assembly 14 is shown in greater detail in FIGS. 2 and 3. The reel assembly 14 comprises: a mounting member 22, the spool or reel 16, a spring cup 174 (having the rewind spring 178 therein), a U-shaped needle 150 having a top (actuator bar) 154, center and lower (shaft) legs 18 and a motor mechanism 200 which includes a web sensor 202, a vehicle sensor 204 and a toothed ratched wheel 208 fixed to the reel 16 which provides information to lock the ratchet wheel and hence the reel from further rotation. The tips or ends of the upper and lower legs of the U-shaped needle are serrated or knurled and are tightly received into openings 131 and 133 within the sensor mechanism.

The mounting member 22 includes two sides 22a, b and an upper back portion 22c and a lower back portion 22d. The upper portion of the back portion includes a sliding link or protrusion 107 that slidingly engages the cooperating part 108 in the center of the back 12c of the stationary frame 12. The interlinking of the frame and mounting member can also be achieved using bosses or rivets extending from the frame that are received in slots in the mounting member. Each of the sides 22a,b of the mounting member includes a central opening 120 to receive the spool or reel 16. Each side 22a,b also includes a small opening 121 through which the upper leg (actuator bar) 154 of the U-shaped needle extends thereby linking the two sides 22a,b together. The lower end of the right hand side 22b of the mounting member also includes another small opening 123 through which a peg or pin 190 extends from the spring cup 174.

The sensor mechanism 200 is a multi-purpose part. Situated at the lower and of the mechanism is a walled housing 209 which defines a cavity 211 in which is placed a part of the sensing mechanism housing the vehicle sensor 204. This vehicle sensor includes a pivoted pawl 212 and an inertia mass 213. During an emergency the mass is moved and raises the pawl causing it to engage the teeth 30 (to achieve a pre-blocking condition) of the ratchet wheel 208 thereby preventing further rotation of the reel 16.

The spool or reel 16 includes a center portion 17 about which the seat belt 19 is wound. The stub axle 170 and stub axle 170a extend from this center part 17. The spool or reel is hollow and the lower leg 18 of the U-shaped needle extends therethrough. The spool rotates about this lower leg.

The spring cup 174 includes a back plate 173 and a generally circular rim 182. The rewind spring 178 is received within the space defined by the back plate and the rim. The lower end of the plate includes the extending peg or pin 190 which is received with the small opening 123 in the lower end of the right hand side 22b of the mounting member in a generally known manner. The outer end of the rewind spring 178 is looped about a projection 180 formed in the spring cup 174. The spring cup also includes an opening 177 through which the spring arbor 170 extends. The spring cup 174 also includes, on or near its top, an extension 183 which includes an opening 184 through which the upper leg of the U-shaped needle extends. The spring cup includes an upstanding boss or projection 194b to receive biasing spring 195 to push or bias the reel assembly downward. A similar boss or projection 194a is located on a portion of the sensor mechanism for another spring 195.

The lower leg 18 of the U-shaped needle defines the shaft 18 and provides a bearing surface about which the spool rotates. The top leg 154 of the U-shaped needle 18 extends through the openings 160' 160" in the frame, as well as narrow guide slots 160a in the spring inner cover 162 (on the right hand side of the retractor) and slot 160b in a mechanism bushing 164 (on the left hand side of the retractor).

As can be seen, the end 192 of the peg 190 physically joins the lower and of the right side 22b of the mounting member 22 to further ensure that the spring cup 174, the U-shaped needle 150 and the mounting member 22 move together as an assembly. The rewind spring is covered by a outer cover and the sensor mechanism is also covered by another outer cover (both of which are not shown). The left hand ends of the upper and lower legs of the U-shaped needle are received within openings 131 and 133 of the sensor mechanism 200.

As can be appreciated, the spring cup 174 is restrained to slide only vertically within the guide slot 160a with the upper leg 154. The lower part of the spring cup 174, by virtue of the use of the peg 190 and oval hole 110, can also only slide vertically. The motion of the left hand portion of the winding mechanism is similarly restrained to achieve only a sliding vertical movement. This is achieved, as the upper leg 154 of the U-shaped pin is received through the vertically oriented guide opening 160b in the mechanism bushing, thereby restraining the upper portion of the sensor mechanism 200 to move vertically. The lower portion of the sensor mechanism, and in particular the housing 210 (in which the vehicle sensor is located), slides against vertical guide walls of the cavity 211 formed within the mechanism bushing. Again, by restraining the sensor mechanism at two locations, both of which only provide for sliding vertical movement, the left hand portion of the winding mechanism is similarly restrained.

Returning briefly to FIGS. 1 and 2, as mentioned the frame 12 includes two sides 12a,b and a rear part 12c. Each side 12a,b includes a square shaped opening into which is placed the web clamping mechanism 46. The front wedge 49a includes a semi-circular, open groove 51 into which the upper leg 154 of the U-shaped needle 18 is secured to provide for a positive engagement between the upper leg and this wedge. The rear wedge 49b is selectively engaged and lifted by a rear portion of the mounting member as it moves vertically.

During assembly, the various parts of the retractor reel assembly 14 are positioned relative to parts of the frame 12 and the bushings 162, and 164 as follows:

The mounting member 22 is placed between each of the bushings 162, 164 and the reel 16 placed through the respective opening in the sides 22a,b of the mounting member 22 with the integral spring arbor 170 extending through the oval opening 174a in the spring inner cover 162. The spring cup 174 is placed against the outside surface of the spring inner cover (spring bushing) 162 with its peg 190 extending through the oval opening 110 in the lower end of the right hand side of the frame 22b. This peg extends through the mating opening 123 in the side 22b of the mounting member 22. In this configuration the return spring 178 is attached to the spring arbor portion of the reel 16 and to the spring cup 174. The upper leg 154 of the U-shaped needle 150 is inserted through the opening 184 in the spring cup, the opening 160a in the spring inner cover 162, the opening 160' in the right hand side 12b of the frame, through the opening 121 in the right hand side of the mounting member, through the groove 51 of the front wedge 49a, and the opening 121 on the left side of the mounting member 22a, the opening 160" in the frame, the opening 160b in the mechanism bushing 164 and the opening 131 in the sensor mechanism 200. The lower leg of the U-shaped needle is inserted through the spring arbor (which already extends into the spring cup 174 and through the other parts of the reel and through the opening 133 in the mechanism bushing 164. With the ends of the upper and lower legs 154 and 18 of the U-shaped needle 150 attached to the sensor mechanism 200, the sensor housing 210 will be positioned within the cavity 211 formed in the mechanism bushing 164. The outer covers are fitted to the bushings to protect the sensor mechanism 200 and spring 178.

During an emergency, one or the other of the inertial sensors, the web or vehicle sensor locks with the ratchet wheel pre-blocking (locking, preventing) the reel 16 from further rotation (see FIG. 4). With the reel now pre-blocked, the reel assembly is vertically lifted as forces are applied to the seat belt 19. As the reel assembly is lifted the upper leg 154 of the U-shaped needle 158 lifts the front wedge 49a initiating the clamping of the seat belt 19. The rear of the mounting member 22 may also be in contact with the rear wedge 49b and lifts this wedge as well. FIG. 5 shows the reel assembly 14 in its lifted position and the wedges 49a,b clamped about the seat belt (webbing) 19. The retractor shown in FIG. 6 comprises a frame 601 supporting a wedge housing 602 having two opposing, sliding wedges 603 and 604. The wedge housing 602 is received within an opening 60b in the frame 601 and includes two sloping surfaces which urge the wedges 603 and 604 closer to one another as they are lifted. A spool 606 is supported within the frame 601 by a U-shaped pin having a centre leg 608 and two side legs the ends of which are shown at 609 and 610. A first side leg 609 is received within the spool 606 and serves as its rotational axis. The spool is rotationally supported on a first side of the first side leg by a bushing and supported on a second side of the first side leg by as an example the spring arbor 611 which also serves as a bushing. A rewind retractor spring 612 of known variety (typically a clock spring) is attached to the spring arbor 611 to provide a rewind force to rewind the seat belt upon the spool 606. The second side leg 610 of the U-shaped pin, is received within a guide which is a first vertical slot 613 formed in the frame 601. This second side leg 610 of the U-shaped needle is entrained within this guide slot 613 so that the U-shaped pin and hence the spool 606 can only move vertically.

Figure 6:
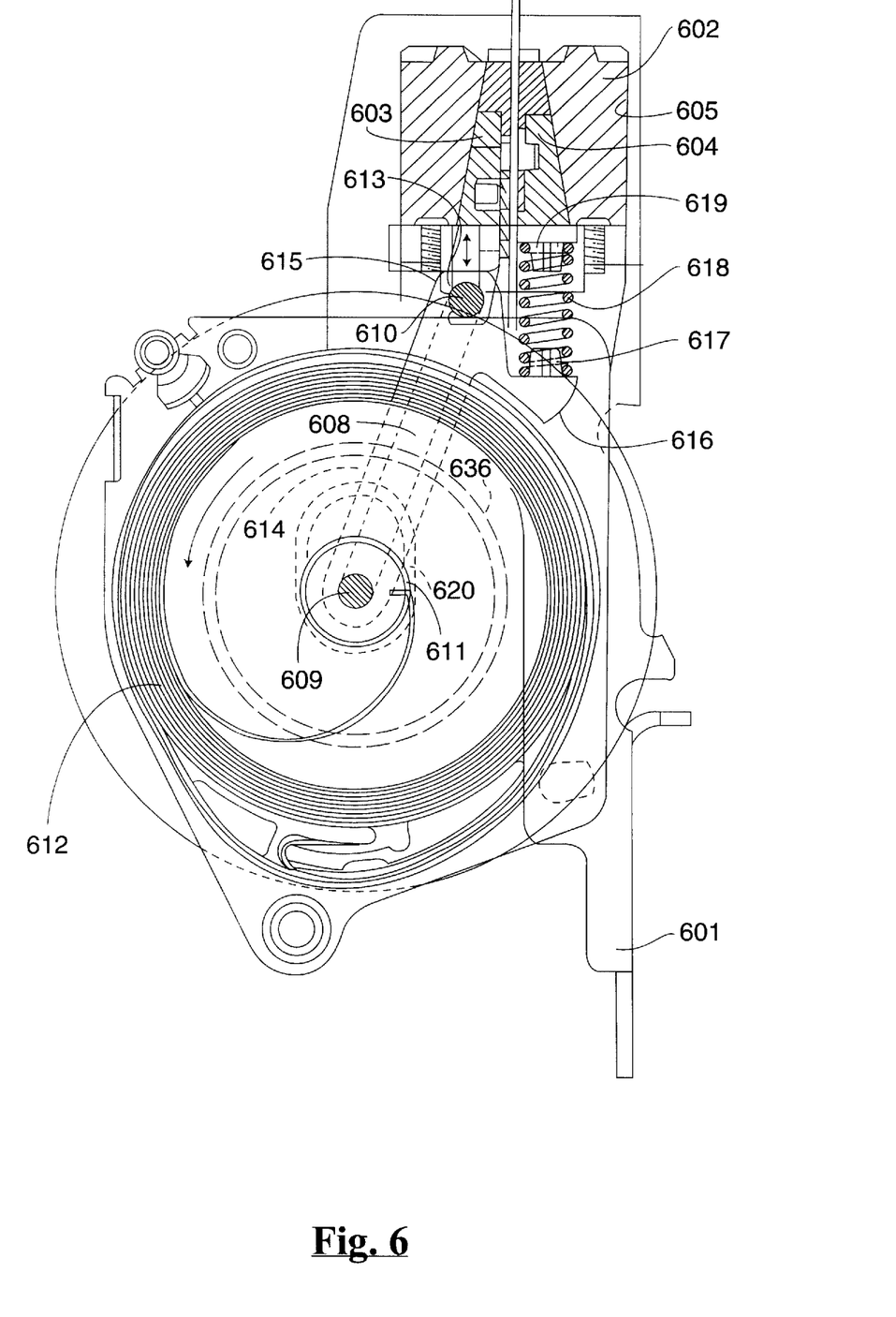
FIG. 6 is a cross-sectional side view of a retractor according to the present invention.

A carrier element 614 extends along the centre leg 608 of the U-shaped needle and is movable therewith. The carrier 614 includes an upper end 615 the edge of which abuts a lower end of at least one of the wedges 603, 604. Upward movement of the carrier 614 lifts the wedges 603, 604 upwardly within the wedge housing 602. The carrier 614 further includes an extending shoulder 616 having a boss 617 formed thereon for receipt of one end of return spring 618. The other end of the return spring 618 is received about another boss 619 mounted to the frame 601. Another return spring may be positioned on the other side of the retractor if needed.

The spool 606 is also supported relative to the centre of the frame. As an example, the spring arbor 611 may be entrained within a first oval, vertically extending slot 620 on one side of the frame. The other side of the retractor may similarly be supported relative to a second oval, vertical extending slot such as by having a stub axle or other part of the spool extend therethrough. In this manner the spool 606, upon lock-up of a ratchet wheel can only slide vertically upward relative to the frame.

While not shown, the other side of the retractor, also referred to as the mechanism side, includes a toothed ratchet wheel, an associated sensing mechanism including a web sensor and vehicle sensor of known variety which, upon activation, causes lock up of the spool.

As is known this lock up occurs when vehicle deceleration exceeds a predetermined level or the rate at which the seat belt is protracted exceeds another level.

During an emergency one or the other of the web or vehicle sensor cause a pawl to engage the teeth on the ratchet wheel to block the spool from further rotation. Any continued force on the belt, such as that exerted by the occupant, is directly transferred to the blocked spool at the interface of the pawl and ratchet. When this force is sufficient to overcome the bias force of the return spring(s), the spool including its rewind spring and associated sensors, is lifted vertically upward relative to the frame. As mentioned the spool is guided within its oval slot(s) and the pin guided within the guide slot. As the spool is lifted the carrier pushes on at least one of the wedges moving same vertically upwards closing the spacing between the wedges relative to the seat belt passing therethrough clamping the seat belt therebetween.

What is claimed is:

1. A weblocking retractor comprising:
   a spool (16) about which seat belt webbing (17) is wound;
   the spool (16) being mounted so as to rotatable about an axis which is slidably mounted in a frame (21);
   at least one sensing mechanism (204) responsive to conditions indicative of a crash to cause the spool (16) to lock to prevent further protraction of the seat belt webbing (17);
   a web-clamping mechanism (46) operable in response to a sliding movement of the spool (16) relative to the frame (12), to clamp the seat belt webbing (17) against further protraction of the belt;
   characterised in that sliding movement of the spool (16) takes place subsequent to locking of the spool (16) and directly activates the clamping mechanism (46) to clamp the webbing (17), and
   wherein the spool (16) is supported for rotational movement on a spindle comprising one arm (150) of a U-shaped needle (18) which is mounted in slots in the frame to move with the spool in a sliding linear movement.

2. A weblocking retractor according to claim 1 characterised in that the second arm (15) of the U-shaped needle (18) comprises an activation bar to move the clamping mechanism (46) into clamping engagement with the webbing.

3. A weblocking retractor according to claim 1 comprising a carrier element supported in fixed relation and movable with the U-shaped needle, comprising a shoulder abutting the web-clamping mechanism to move it into a web-clamping condition.

4. A weblocking retractor according to claim 1, wherein the web-clamping mechanism (46) comprises two opposing sliding wedges (49a) arranged for gripping the webbing (17) therebetween.

5. A weblocking retractor according to claim 4, wherein the web-clamping mechanism (46) comprises a wedge housing (47) having two sloping surfaces for urging the wedges (49a) closer to one another as they are lifted.

6. A weblocking retractor according to claim 2 wherein the second arm (154) abuts the lower end of at least one wedge (49a) to move it into clamping engagement.

7. A weblocking retractor according to claim 4 comprising a return spring (195,618), one on each side of the retractor.

8. A weblocking retractor according to claim 1, wherein the spool (16) is supported relative to the centre of the frame.

9. A weblocking retractor according to claim 1, wherein the force on the belt after lock-up of the spool is transferred directly to the blocked spool (16) to lift the spool against the force of a return spring.

10. A weblocking retractor according to claim 9, wherein the force on the belt is transferred to the spool at the interface of sensing mechanism (204) which comprises a co-operating pawl (217) and ratchet (202).

11. A weblocking retractor according to claim 1, comprising oval guide slots for the U-shaped needle.

12. A weblocking retractor comprising:
    a spool about which a seat belt webbing is wound, the spool being mounted for rotational movement on a spindle the ends of which are received in a slot in a frame so as to be slidable in the frame, the spindle comprises an arm of a U-shaped needle, the arms of which are received in respective slots in the frame;
    at least one sensing mechanism responsive to conditions indicative of a crash to cause the spool to lock to prevent further protraction of the seat belt webbing;
    a web clamping or locking mechanism operable in response to substantially vertical movement of the spool, relative to the frame, to clamp the seat belt webbing against further protraction;
    wherein vertical movement of the spool takes place subsequent to locking of the spool and directly causes clamping off the webbing by the web clamping mechanism.

13. A web locking retractor defined in claim 12 wherein the web clamping mechanism comprises two opposing, sliding wedges arranged for gripping the webbing therebetween.

14. The web locking retractor defined in claim 13, wherein the web clamping mechanism comprises a wedge housing having two sloping surfaces for urging the wedges closer to one another as they are lifted.

15. The web locking retractor defined in claim 12 further comprising a carrier element supported in fixed relation to the spool and movable therewith.

16. A web locking retractor defined in claim 15 wherein the carrier has a shoulder which abuts a lower end of at least one of the wedges.

17. A web locking retractor defined in claim 12 further comprising a return spring for the wedges.

18. A web locking retractor defined in claim 17 comprising two return springs, one on each side of the retractor.

19. A web locking retractor defined in claim 12 wherein the spool is supported relative to the center of the frame.

20. A web locking retractor as defined in claim 17 wherein a force on the belt after lock-up of the spool is transferred directly to the locked spool to lift the spool against the force of the return spring.

21. A web locking retractor defined in claim 20 wherein the force on the belt is transferred to the spool at an interface of the pawl and the ratchet.

22. A web locking retractor as defined in claim 12 wherein each slot is oval.

23. A web locking retractor comprising:

a stationary frame (12), a clamping wedge and a reel assembly (14) including a spool or reel member, the reel assembly includes a mounting member (22) that is slidingly mounted to the frame via a U-shaped needle member (150); an upper leg (154) of the U-shaped needle member functions as an activation bar to move the clamping wedge into clamping engagement about a seat belt (19) after the spool or reel member has been pre-blocked; a lower leg (18) of the U-shaped needle member serves as a shaft about which the reel rotates.

* * * * *